United States Patent
Ue et al.

(10) Patent No.: US 6,366,763 B1
(45) Date of Patent: *Apr. 2, 2002

(54) RADIO COMMUNICATION DEVICE AND METHOD OF CONTROLLING TRANSMISSION RATE

(75) Inventors: Toyoki Ue; Katsuhiko Hiramatsu; Osamu Kato, all of Yokosuka (JP)

(73) Assignee: Matsushita Electric Industrial, Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/648,756

(22) Filed: Aug. 28, 2000

Related U.S. Application Data

(63) Continuation of application No. 09/424,843, filed on Dec. 6, 1999.

(30) Foreign Application Priority Data

Apr. 17, 1998 (JP) .......................................... 10-107300

(51) Int. Cl.[7] ................................................ H04B 7/00
(52) U.S. Cl. ............................. 455/69; 455/63; 455/69; 455/67.4; 455/522
(58) Field of Search ........................ 455/63, 67.3, 69, 455/67.6, 522; 370/475, 479

(56) References Cited

U.S. PATENT DOCUMENTS

| | | | |
|---|---|---|---|
| 5,483,676 A | * 1/1996 | Mahany et al. | 455/67.3 |
| 5,528,593 A | * 6/1996 | English et al. | 370/391 |
| 5,603,096 A | 2/1997 | Gilhousen et al. | |
| 5,701,294 A | 12/1997 | Ward et al. | |
| 5,822,318 A | * 10/1998 | Tiedemann Jr. et al. | 370/391 |
| 5,825,761 A | 10/1998 | Tanaka et al. | |
| 5,920,552 A | 7/1999 | Allpress et al. | |
| 6,044,067 A | * 3/2000 | Suzuki | 370/252 |
| 6,075,974 A | * 6/2000 | Saints et al. | 455/69 |

FOREIGN PATENT DOCUMENTS

| | | |
|---|---|---|
| CA | 2204057 | 11/1997 |
| EP | 0627827 | 12/1994 |
| JP | 7143572 | 6/1995 |
| JP | 8340308 | 12/1996 |
| JP | 946290 | 2/1997 |
| JP | 9506231 | 6/1997 |
| JP | 9312649 | 12/1997 |
| JP | 1075209 | 3/1998 |
| JP | 10502778 | 3/1998 |
| WO | 9604718 | 2/1996 |

OTHER PUBLICATIONS

An English Language abstract of JP–8–340308.
An English Language abstract of JP–9–312649.
An article entitled "Performance of SIR–Based Transmit Power Control Using Outer Loop In The Forward Link Of DS–CDMA", by F. Kikuchi et al., published in Technical Report of IEICE, A–P–96–148, EMCJ96–83, RCS96–162, MW96–188 (1997–02).

* cited by examiner

*Primary Examiner*—Daniel Hunter
*Assistant Examiner*—Alan T. Gantt
(74) *Attorney, Agent, or Firm*—Stevens, Davis, Miller & Mosher, LLP

(57) ABSTRACT

The communication terminal apparatus measures reception quality and reports the measurement result to the base station apparatus, and the base station apparatus switches the transmission rate based on the reported result of the reception quality. In this way, the transmission rate is switched starting at the point in time at which the reception quality of the communication terminal apparatus deteriorates. Furthermore, the transmission rate is switched so that the amount of interference with others is within the allowable range according to the channel condition between the communication terminal apparatus and base station apparatus.

7 Claims, 15 Drawing Sheets

(a) WHEN FLAG = MESSAGE (b) WHEN FLAG = CONTROL INFORMATION

WHEN TERMINAL APPARATUS STARTS TO REPORT UPON RECEPTION OF RECEPTION QUALITY MEASUREMENT RESULT

WHEN BASE STATION APPARATUS STARTS TO REQUEST FOR REPORT ON RECEPTION QUALITY TO TERMINAL UPON RECEPTION OF RECEPTION QUALITY MEASUREMENT RESULT

WHEN BASE STATION APPARATUS STARTS TO REQUEST FOR REPORT ON RECEPTION QUALITY TO TERMINAL UPON RECEPTION OF RESEND REQUEST FROM TERMINAL

WHEN BASE STATION APPARATUS STARTS TRANSMISSION RATE SWITCHING CONTROL BASED ON OWN TRANSMISSION POWER

RADIO COMMUNICATION DEVICE AND METHOD OF CONTROLLING TRANSMISSION RATE

This application is a continuation of prior application Ser. No. 09/424,843 filed Dec. 6, 1999.

TECHNICAL FIELD

The present invention relates to a radio communication apparatus with a variable transmission rate and a transmission rate control method.

BACKGROUND ART

A conventional radio communication apparatus is explained using a document "Performance of SIR-Based Transmit Power Control using Outer Loop in the forward Link of DS-CDMA (TECHNICAL REPORT OF IEICE AP96-148, EMCJ96-83, RCS96-162, MW96-188 (1997-02)." This document describes a transmission power control method in CDMA. The following is an explanation of this description.

In transmission power control, measurement of SIR indicating the reception quality and increment/decrement of transmission power are performed at every slot cycle (0.625 ms). In this case, if the measured SIR is greater than the target SIR a command to reduce transmission power is sent to the base station (transmission side) and if the measured values is smaller than the target SIR a command to increase transmission power is sent to the base station. The base station increments or decrements transmission power according to this command.

Furthermore, the base station controls the outer loop taking into account the fact that the target SIR to acquire the required quality (FER: Frame Error Rate) varies depending on the environment of a mobile station. To be more specific, FER is measured from decoded data. This FER is compared with the target FER in every several frames and if the measured value is greater, the target SIR is increased and if the measured value is smaller, the target SIR is reduced.

The prior art performs transmission power control not only by sending a transmission power control command to the transmitting side based on the SIR measured by the mobile station but also by changing the target SIR through outer loop control.

However, the prior art has the following problem. That is, the target SIR increases depending on the environment and transmission rate of the mobile station and the reception SIR sometimes decreases due to fading, etc. In such a case, the mobile station instructs the base station to increase transmission power to make the reception SIR come closer to the target SIR, considerably increasing transmission power of the base station to the mobile station, which is likely to increase interference with other mobile stations to an intolerable degree.

DISCLOSURE OF INVENTION

It is an objective of the present invention to provide a radio communication apparatus and transmission rate control method capable of controlling transmission power of a base station directed to a mobile station appropriately without being affected by the environment of the mobile station or transmission rate.

This objective is achieved by a radio communication apparatus and transmission rate control method that switch the transmission rate of a transmission signal based on reception quality information from the other end of communication, or according to the environment of the other end of communication and transmit the signals at the switched transmission rate.

BEST MODE FOR CARRYING OUT THE INVENTION

With reference now to the attached drawings, the embodiments of the present invention are explained in detail below.

Embodiment 1

Figure 1:
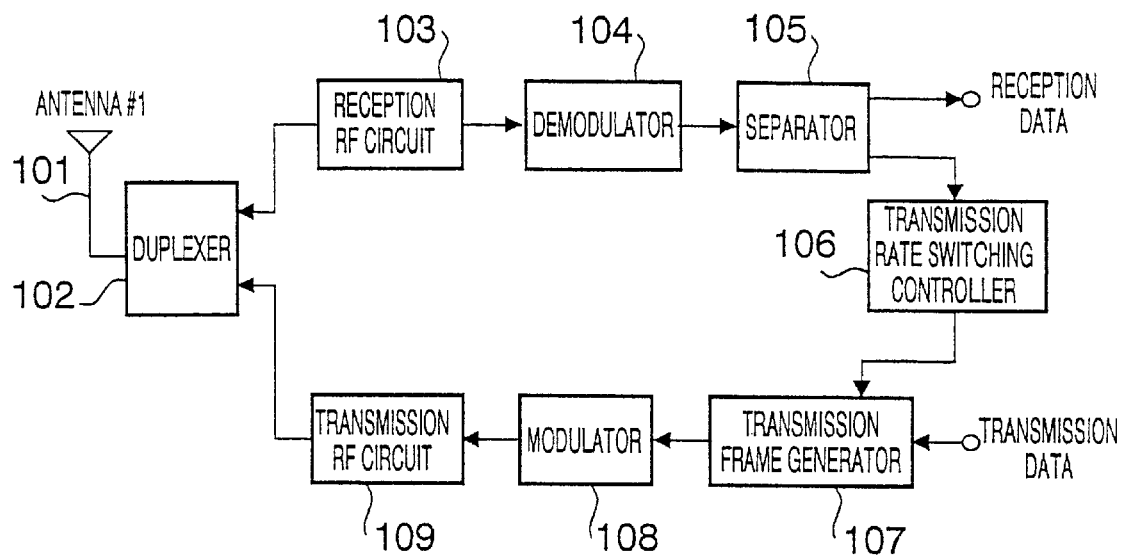
FIG. 1 is a block diagram showing a configuration of a base station apparatus according to Embodiment 1 of the present invention.

FIG. 1 is a block diagram showing a configuration of a base station apparatus according to Embodiment 1 of the present invention. In this base station apparatus, a signal received from antenna 101 is sent to reception RF circuit 103 via duplexer 102 to use a same antenna for both transmission and reception. At reception RF circuit 103, the reception signal is amplified and converted to an intermediate frequency or a baseband frequency.

The frequency-converted signal is demodulated by demodulator 104. The demodulation result is sent to separator 105, where it is separated into reception data and a signal for transmission rate switching control.

Transmission rate switching controller 106 sends a transmission rate switching signal to transmission frame generator 107 based on the received control signal. The operation of the transmission rate switching control circuit will be explained later.

Regarding transmission, the transmission data are modulated by modulator 108 and sent to transmission RF circuit 109. Transmission RF circuit 109 converts the frequency of the transmission data and then amplifies it. This transmission signal is sent from antenna 101 via duplexer 102.

Figure 2:
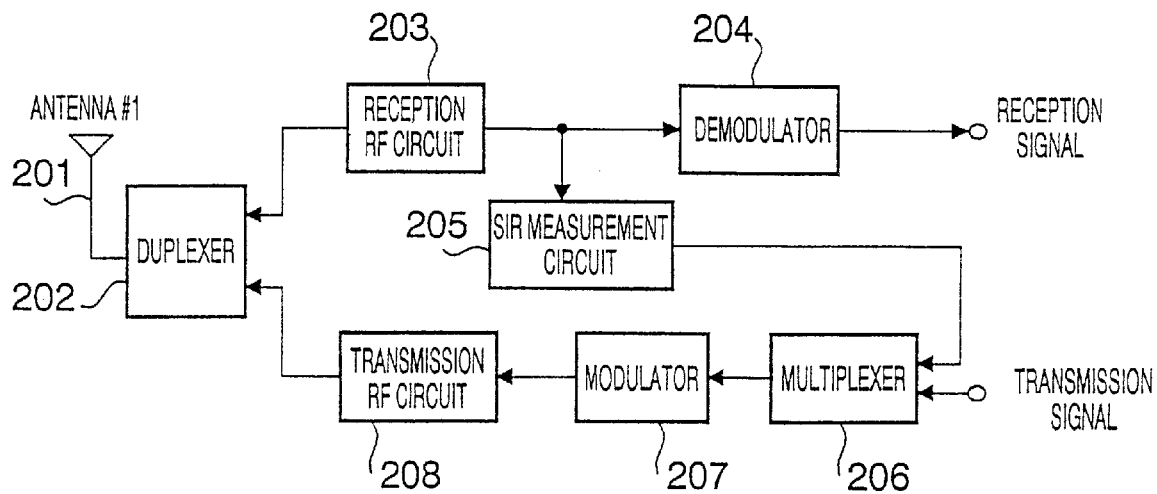
FIG. 2 is a block diagram showing a configuration of a communication terminal apparatus that carries out a radio communication with the base station apparatus according to the embodiment above.

FIG. 2 is a block diagram showing a configuration of a communication terminal apparatus that carries out a radio communication with the base station apparatus according to Embodiment 1 of the present invention.

A signal received from antenna 201 is sent to reception RF circuit 203 via duplexer 202 to use a same antenna for both transmission and reception, where it is amplified and converted to an intermediate frequency or a baseband frequency. The frequency-converted signal is demodulated by demodulator 204. At the same time, the output signal of the reception RF circuit is sent to reception quality measurement circuit 205, where the reception quality is measured.

This reception quality includes, for example, received signal strength, desired signal reception power, signal to interference ratio (SIR), Signal-to-Interference plus Noise Ratio (hereinafter abbreviated as "SINR"). The received signal strength is obtained by measuring the power of reception RF. The use of the received signal strength makes the circuit configuration simplest and allows the use in an environment free of interference signals.

The reception power of a desired signal is measured by multiplying the reception signal by a known signal. In this case, if an interference signal exists, using the received signal strength alone would end up reporting the reception power of the desired signal and the interference signal, and this would mean that the reception power of a desired signal required by the terminal might not always be reported. Therefore, in order to measure and report the reception power of the desired signal required by the terminal, it is desirable to use SINR as the reception quality which is the most reliable information as an index to determine an error rate characteristic.

Figure 3:
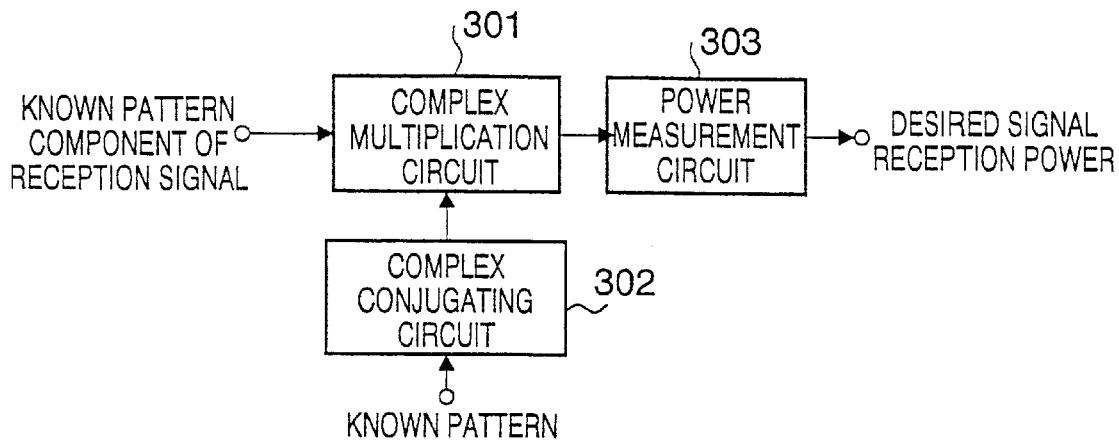
FIG. 3 is a block diagram to explain a desired signal reception power measurement method in the communication terminal apparatus above.
Figure 5:
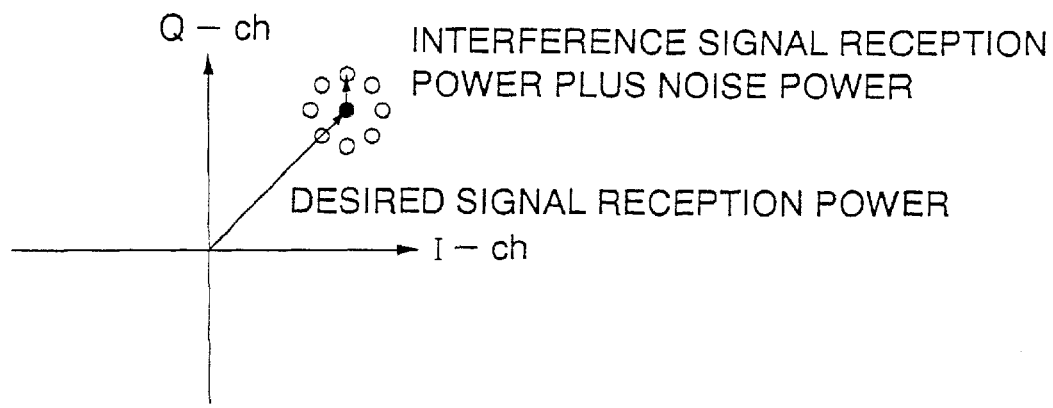
FIG. 5 is a diagram to explain a method of signal-to-interference plus noise ratio in the communication terminal apparatus above.

A measurement circuit for the desired signal reception power is shown in FIG. 3. This circuit extracts the known pattern component of the reception signal; complex conjugate circuit 302 carries out a complex conjugate operation on the known pattern held by the base station; complex multiplication circuit 301 carries out a complex multiplication on the known pattern component of the reception signal and the known pattern subjected to the complex conjugate operation and calculates the position of the desired reception signal on the complex plane (position of the black circle in FIG. 5); and power measurement circuit 303 measures the power from this calculation result.

Figure 4:
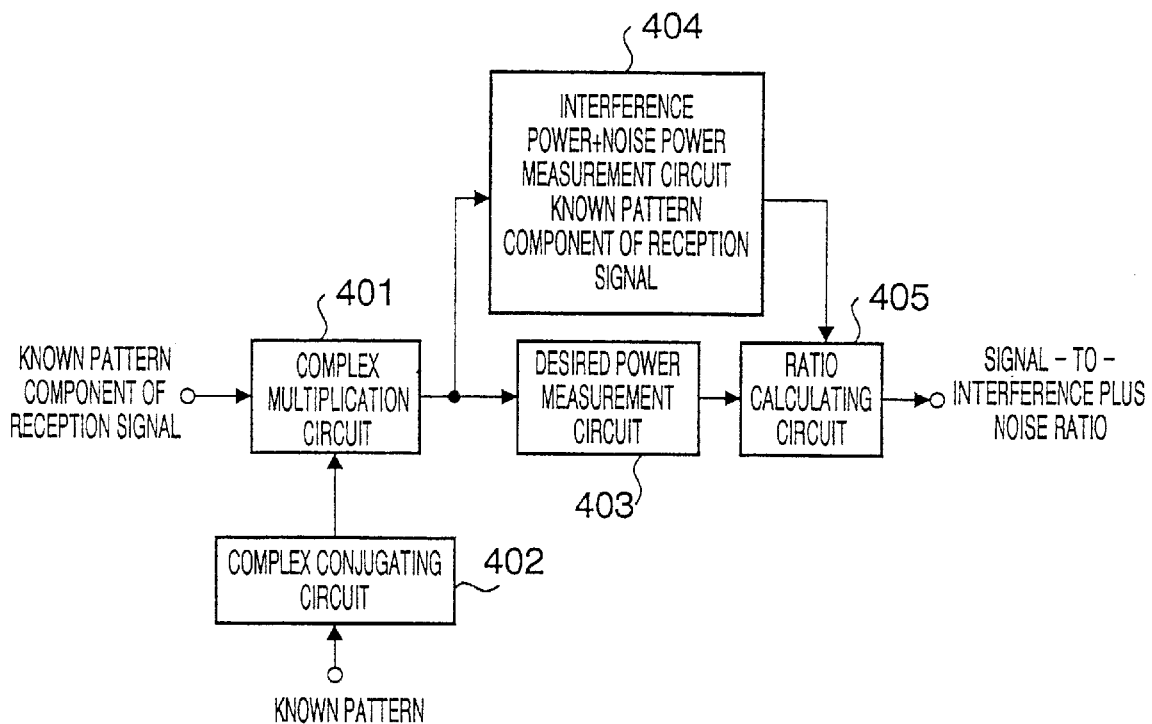
FIG. 4 is a block diagram to explain a method of measuring signal-to-interference plus noise ratio in the communication terminal apparatus above.

On the other hand, an SINR measurement circuit is shown in FIG. 4. This circuit extracts the known pattern component of the reception signal; complex conjugate circuit 402 carries out a complex conjugate operation on the known pattern held by the base station; complex multiplication circuit 401 carries out a complex multiplication on the known pattern component of the reception signal and the known pattern subjected to the complex conjugate operation and calculates the position of the desired reception signal on the complex plane (position of the black circle in FIG. 5); and the power is measured from this calculation result. Furthermore, interference signal+noise power measurement circuit 404 measures interference signal power+noise power from a mean value of vector sum of squares between the position of each reception signal (position of the white circle in FIG. 5) and position of the desired reception signal (position of the black circle in FIG. 5). Furthermore, desired power measurement circuit. 403 measures the desired power from the calculation result above. Then, ratio calculation circuit 405 calculates the ratio between the output of interference signal+noise power measurement circuit 404 and the output of desired power measurement circuit 403. SINR is calculated from this.

The reception quality measurement result calculated in this way is sent to multiplexing circuit 206. Multiplexing circuit 206 assigns the transmission data and reception quality measurement result to a transmission slot. Modulation circuit 207 modulates such transmission data and transmission RF circuit 208 converts the frequency and amplifies. This transmission signal is sent from antenna 201 via duplexer 202.

Here, how the transmission rate switching information is reported from the communication terminal apparatus to the base station apparatus is explained. There are two types of reporting; reporting all the time and reporting on an as-needed basis. Since the first method performs reporting all the time, it can switch the transmission rate with high precision but the amount of communication increases.

Figure 6:
FIG. 6 is a data frame configuration diagram used in a communication by the base station apparatus of the present invention.

In the case of voice communications, voice information (message) is often transmitted multiplexed with control information in one slot as shown in FIG. 6. Therefore, reporting all the time is possible in voice communications or low-speed data communications.

Figure 7:
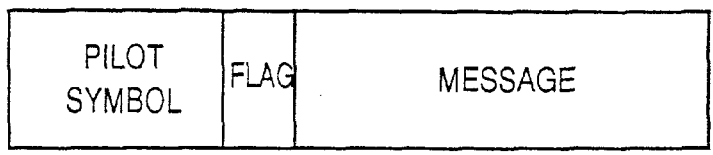
FIG. 7 is another data frame configuration diagram used in a communication by the base station apparatus of the present invention.
Figure 7:
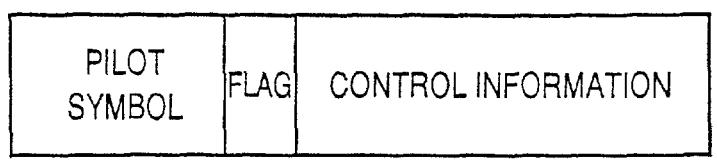

In the latter method, only a small amount of communication is required because reporting is performed only when required. It is desirable to use this method for packet communications to realize high-speed data communications. In packet communications, intermittent information is sent in a short time. Thus, as shown in FIG. 7(*a*) and FIG. 7(*b*), control information is not multiplexed in a slot but a flag indicating whether it is a message or control information is used. FIG. 7(*a*) shows a case where a flag is set to indicate a message. FIG. 7(*b*) shows a case where a flag is set to indicate control information.

Figure 8:
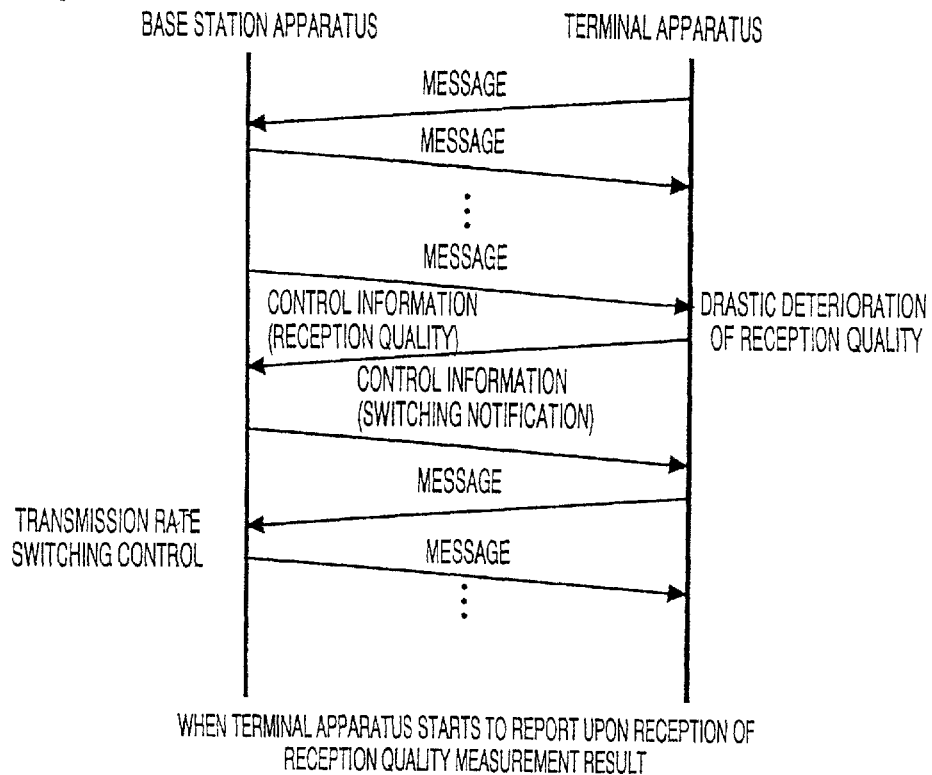
FIG. 8 is a sequence diagram between the base station apparatus and communication terminal apparatus of the present invention.

Then, the timing for switching the transmission rate is explained. There are four methods of timing for switching the transmission rate as shown below:

The first method is explained using FIG. 8. While the transmission terminal apparatus is measuring the reception quality, there are moments the reception quality deteriorates drastically. In a mobile communication environment, in the case of non-line-of-sight (non-LOS) communication called "shadowing", for example, the received signal strength decreases drastically by 10 dB or more. While monitoring such a situation, reporting is made when the reception quality deteriorates drastically. Upon reception of this reception quality report, the base station apparatus switches the transmission rate. When the reception quality improves, which is measured on the communication terminal side periodically or by a demand from the base station, the base station apparatus switches the transmission rate to the original transmission rate The timing at which the reception quality deteriorates or improves drastically can be detected by performing threshold judgment on the reception quality such as reception field density, for example.

Figure 9:
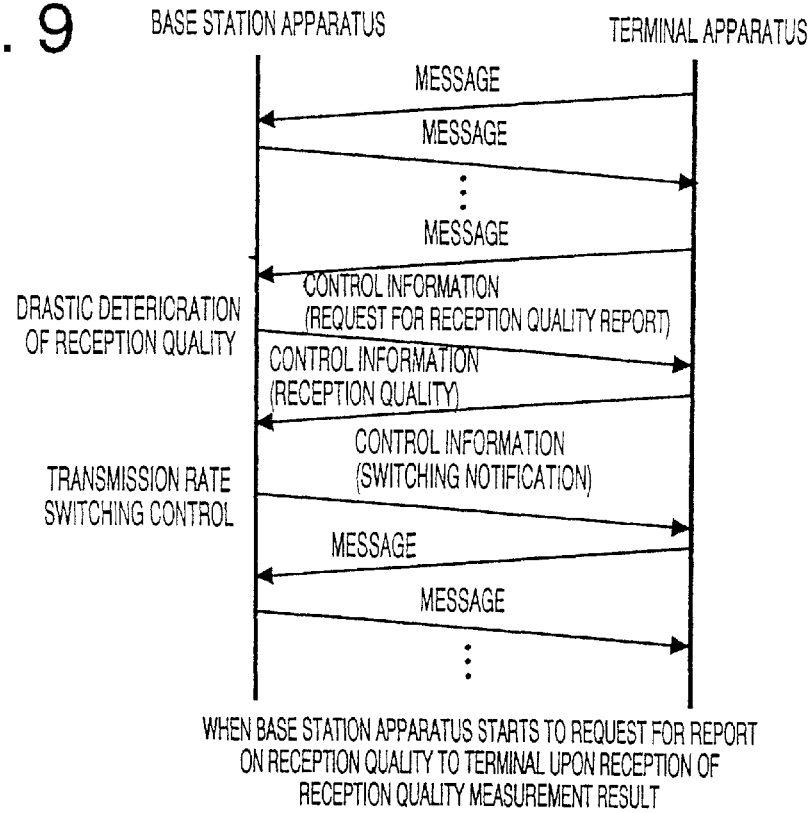
FIG. 9 is another sequence diagram between the base station apparatus and communication terminal apparatus of the present invention.

Then, the second method is explained using FIG. 9. The base station apparatus measures the reception quality. If the reception quality deteriorates drastically, this can be determined as non-LOS communication called "shadowing." Shadowing is determined by the position of the antenna of the communication terminal apparatus and the antenna of the base station apparatus and not affected by differences in the carrier frequency. Therefore, in such a case, it is possible that the reception quality will also deteriorate drastically in the communication terminal apparatus. Thus, the base station apparatus sends a request for reporting the reception quality to the communication terminal apparatus. The communication terminal apparatus measures the reception quality and reports it to the base station apparatus. The base station apparatus performs transmission rate switching control according to the reported reception quality. When the reception quality improves, which is measured on the communication terminal side periodically or by a request from the base, the base station apparatus switches the transmission rate to the original transmission rate. The timing at which the reception quality deteriorates or improves drastically can be detected by performing threshold judgment on the reception quality, for example, received signal strength.

Figure 10:
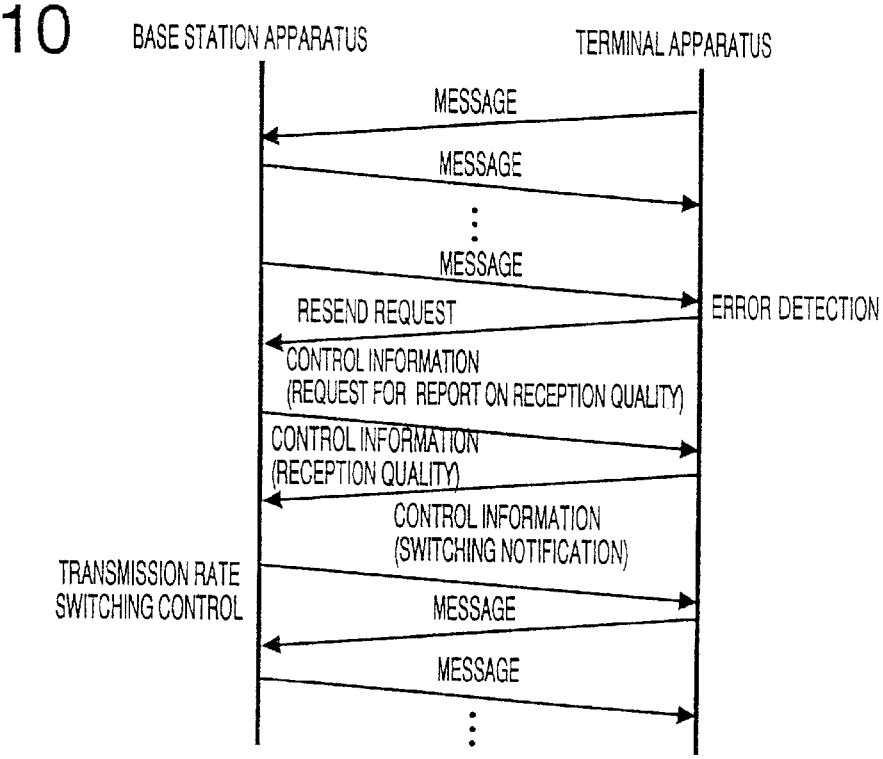
FIG. 10 is another sequence diagram between the base station apparatus and communication terminal apparatus of the present invention.

Then, the third method is explained using FIG. 10. If there is an error in the message received, the communication terminal apparatus issues a retransmission request. The base station apparatus sends a request for reporting the reception quality to the communication terminal apparatus when the communication terminal apparatus issues a retransmission request. The communication terminal apparatus measures the reception quality and reports it to the base station apparatus. The base station apparatus performs transmission rate switching control according to the reported reception quality. For example, if the reported reception quality measured by the communication terminal apparatus is lower than a predetermined value, the base station apparatus switches the transmission rate. When the reception quality improves, which is measured on the communication terminal side periodically or by a demand from the base station, the base station apparatus switches the transmission rate to the original transmission rate. The timing at which the reception quality deteriorates or improves drastically can be detected by performing threshold judgment on the reception quality, for example, received signal strength.

Figure 11:
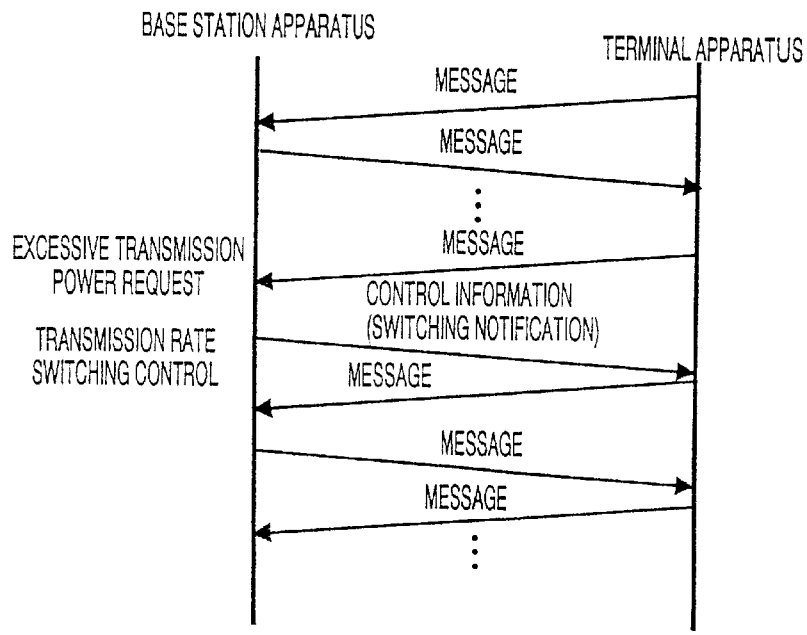
FIG. 11 is another sequence diagram between the base station apparatus and communication terminal apparatus of the present invention.

Then, the fourth method is explained using FIG. 11. The base station apparatus monitors the transmission power of itself. The base station apparatus controls the transmission power based on a transmission power control signal sent from the communication terminal apparatus, and if the quality of transmission from the base station apparatus to the communication terminal apparatus deteriorates, the communication terminal apparatus requests an increase of transmission power. If this request is judged to be excessive transmission power taking into account the amount of interference with others, the base station apparatus performs transmission rate switching control. Judgment of excessive transmission power can be performed by threshold judgment, for example. Moreover, if a predetermined allowable amount of transmission power has been secured, then the base station apparatus switches the transmission rate to the original transmission rate. This predetermined allowable amount of transmission power is determined appropriately according to the amount of transmission rate controlled. For example, if the transmission rate is reduced to ½, the transmission rate is switched when at least an allowable amount of 3 dB has been secured.

By the way, combining some of the 4 methods above can eliminate delays in switching the transmission rate and perform delicate control.

Thus, the reception quality measurement result of the downlink signal transmitted from the base station apparatus shown in FIG. 1 is measured by the communication terminal apparatus in FIG. 2 and reported to the base station on the uplink. The base station switches the transmission rate based on the reception quality measured and received on the uplink by the transmission terminal apparatus.

Figure 12:
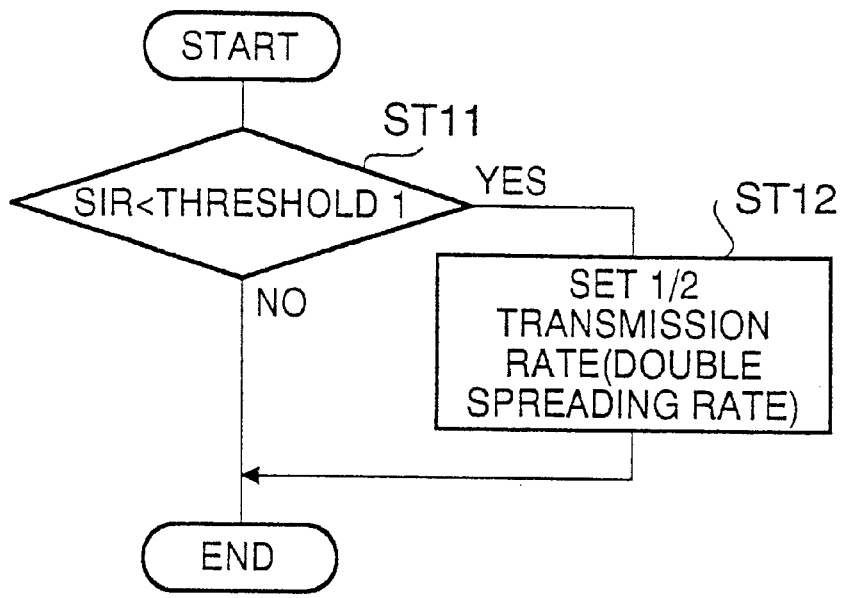
FIG. 12 is a flow chart to explain a transmission rate switching method in the base station apparatus according to the embodiment above.

Here, the operation of the transmission rate switching control circuit is explained in detail. FIG. 12 is a flow chart of the transmission rate switching control circuit. In ST11, the base station apparatus compares the reception quality measurement result reported from the communication terminal apparatus with threshold 1. Here, a case when SIR is used as the reception quality is explained, but the same applies when the received signal strength, desired signal reception power or SINR is used. This threshold 1 is set according to the transmission rate, but in a CDMA communication system, it is set according to the spreading factor or the number of multiplexing codes.

If the reception quality measurement result (SIR) is greater than threshold 1, the same transmission rate is used. If SIR is smaller than threshold 1, the channel condition is determined to be bad and the transmission rate is changed to a ½ transmission rate (ST12).

Figure 13:
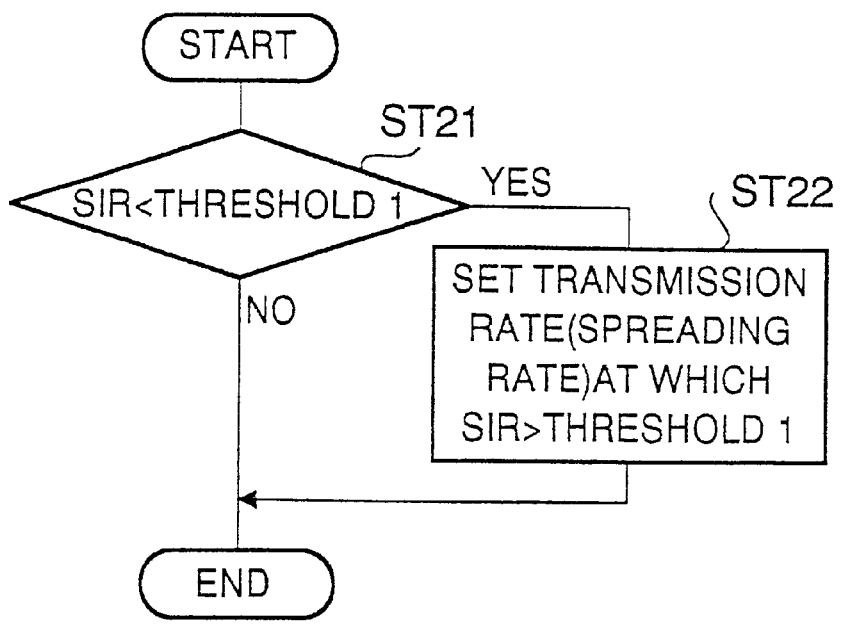
FIG. 13 is another flow chart to explain a transmission rate switching method in the base station apparatus according to the embodiment above.

Moreover, as shown in FIG. 13, the base station apparatus compares the reception quality measurement result reported from the communication terminal apparatus with threshold 1 (ST21) and if SIR is greater than threshold 1, the same transmission rate is used. If SIR is smaller than threshold 1, the transmission rate is switched to such a transmission rate that SIR is greater than threshold 1 (ST22). In CDMA, the spreading factor is switched. Thus, SIR exceeds threshold 1 and more accurate control can be performed on varying reception quality. This makes it possible to improve the reception quality of the other end of communication even if the condition of the communication path with the other end of communication deteriorates drastically and reduce the amount of interference with others because the target reception quality is reduced and transmission power is reduced. Therefore, it is possible to enhance the effect of switching the transmission rate.

Figure 14:
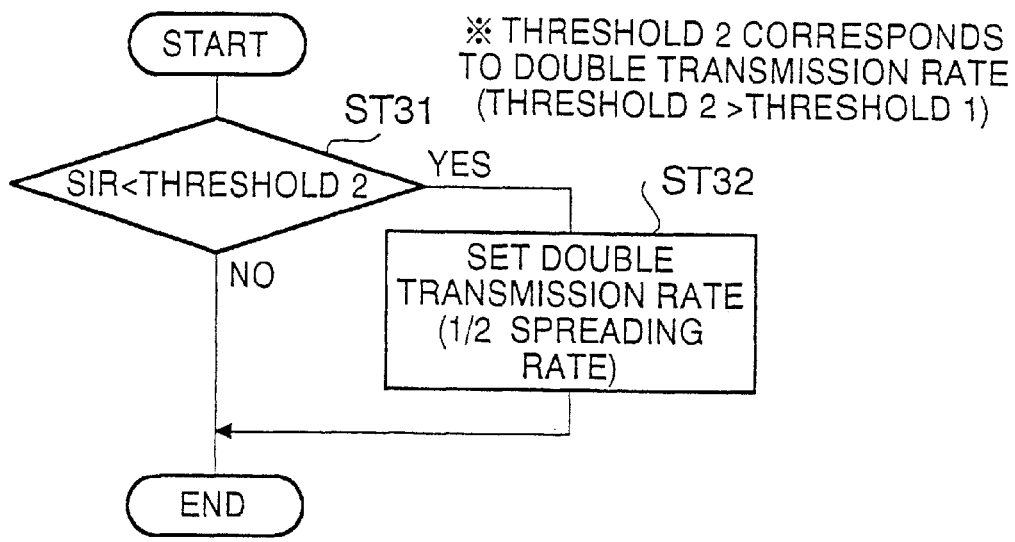
FIG. 14 is another flow chart to explain a transmission rate switching method in the base station apparatus according to the embodiment above.

Moreover, as shown in FIG. 14, the base station apparatus compares the reception quality measurement result reported from the communication terminal apparatus with threshold 2 (ST31) and if SIR is smaller than threshold 2, the same transmission rate is used and if SIR is greater than threshold 2, the channel condition is determined to be good and the transmission rate is switched to a double transmission rate (½ spreading factor)(ST32). Here, threshold 2 corresponds to a double transmission rate and is set greater than threshold 1. Thus, while the channel condition is good, the transmission rate is increased to transmit as much data as possible. That is, if the condition of the communication path with the other end of communication is good, faster transmission is possible while maintaining the reception quality of the other end of communication. However, since the transmission power does not increase, interference with others does not increase.

Figure 15:
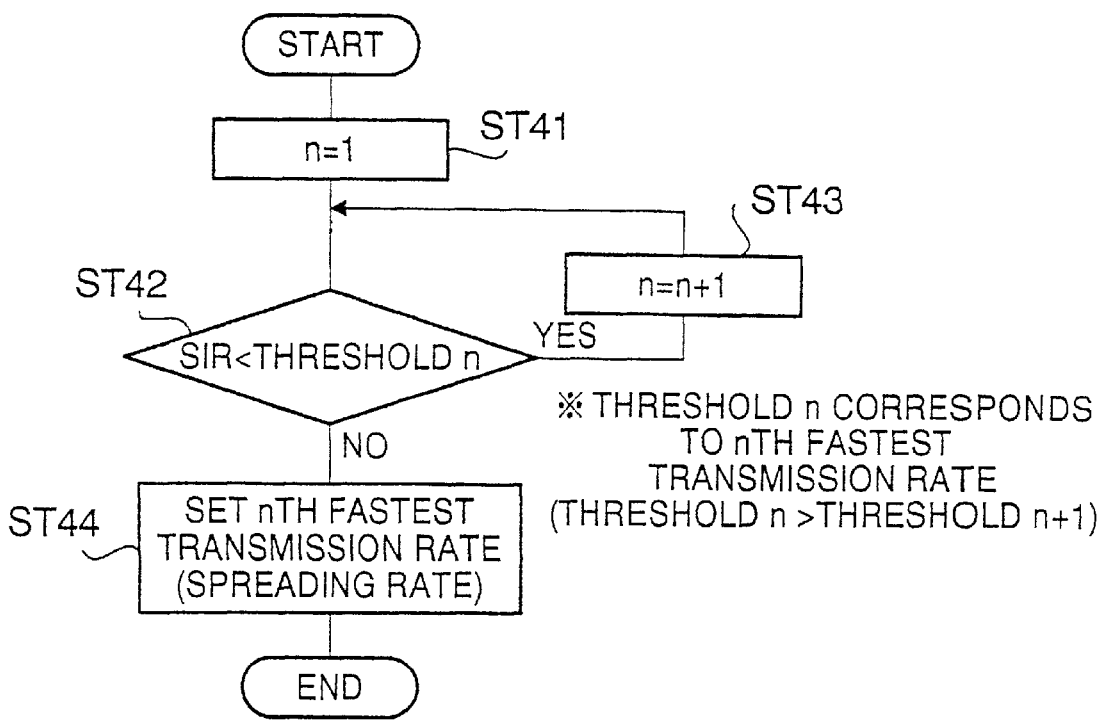
FIG. 15 is another flow chart to explain a transmission rate switching method in the base station apparatus according to the embodiment above.

Moreover, as shown in FIG. 15, threshold n is set (ST41) and the base station apparatus compares the reception quality measurement result reported from the communication terminal apparatus with threshold n (ST42). If SIR is smaller than threshold n, threshold n is switched to threshold n+1 corresponding to the next fastest transmission rate (ST43). If SIR is greater than threshold n, the nth fastest transmission rate (spreading factor) is set (ST44). That is, the transmission rate is switched to such a transmission rate that SIR is set to a value between threshold n and threshold n+1 corresponding to the two transmission rates. Threshold n corresponds to the nth fastest transmission rate and is greater than threshold n+1. In this case, the fastest transmission is possible on condition that the reception quality be satisfied. This allows more accurate control over the transmission rate according to the channel condition.

Using such a method, it is possible to switch the transmission rate of the base station according to the reception quality of the communication terminal apparatus. This not only avoids the reception quality of the other end of communication from continuing to be bad but also reduces transmission power because the target reception quality reduces, which reduces interference with others. Therefore, it is possible to control the transmission power of the base station to the communication terminal apparatus appropriately without being affected by the environment of the communication terminal apparatus and transmission speed.

Embodiment 2

Figure 16:
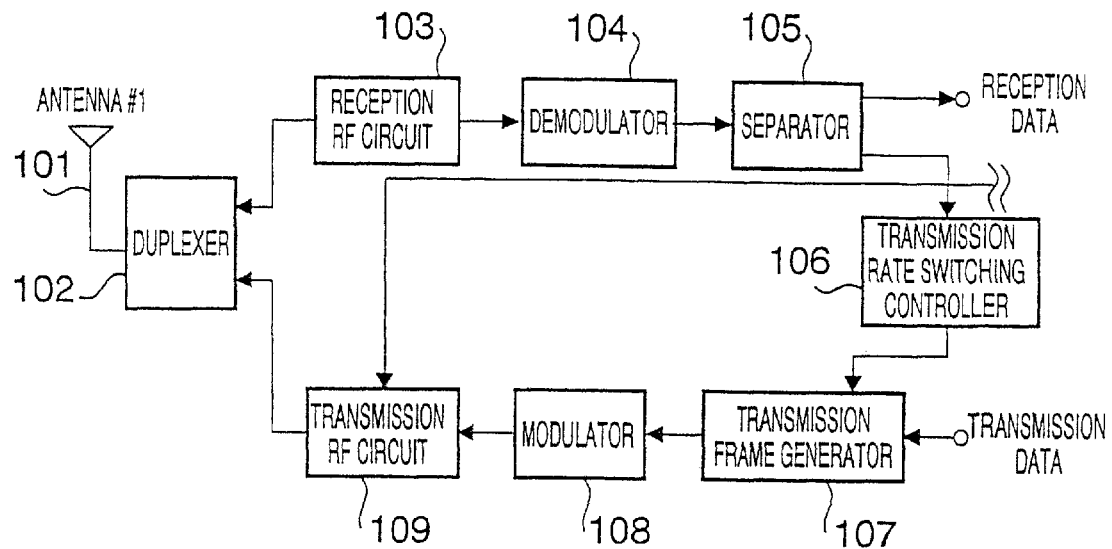
FIG. 16 is a block diagram showing a configuration of a base station apparatus according to Embodiment 2 of the present invention.

FIG. 16 is a block diagram showing a configuration of a base station apparatus according to Embodiment 2 of the present invention.

In this base station apparatus, a signal received from antenna 101 is sent to reception RF circuit 103 via duplexer 102 to use a same antenna for both transmission and reception. At reception RF circuit 103, the reception signal is amplified and converted to an intermediate frequency or a baseband frequency.

The frequency-converted signal is demodulated by demodulator 104. The demodulation result is sent to separation circuit 105, where it is separated into reception data and transmission power control signal.

Transmission rate switching control circuit 106 sends a transmission rate switching signal to transmission frame generator 107 based on the transmission power control signal. The operation of the transmission rate switching control circuit will be explained later.

Regarding transmission, the transmission data are modulated by modulation circuit 108 and sent to transmission RF circuit 109. Transmission RF circuit 109 converts the frequency of the transmission data. This transmission signal is sent from antenna 101 via duplexer 102.

Figure 17:
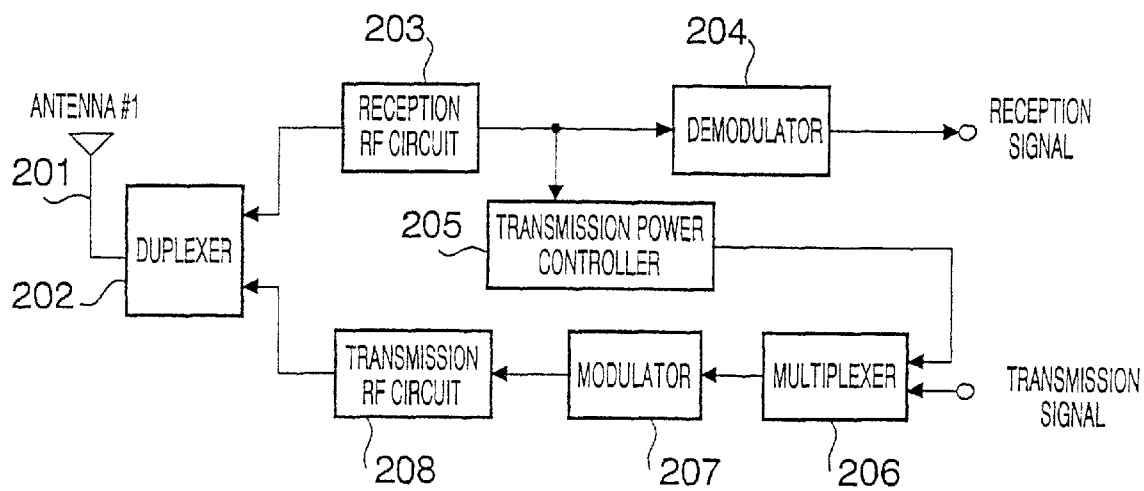
FIG. 17 is a block diagram showing a configuration of a communication terminal apparatus that carries out a radio communication with the base station apparatus according to the embodiment above.

FIG. 17 is a block diagram showing a configuration of a communication terminal apparatus that carries out a radio communication with the base station apparatus according to Embodiment 2 of the present invention.

A signal received from antenna 201 is sent to reception RF circuit 203 via duplexer 202 to use a same antenna for both transmission and reception, where it is amplified and converted to an intermediate frequency or a baseband frequency. The frequency-converted signal is demodulated by demodulator 204. At the same time, the output signal of the reception RF circuit is sent to transmission power control value calculation circuit 205, where the transmission power control signal is determined.

This transmission power control signal includes, for example, received signal strength, desired signal reception power, signal to interference ratio (SIR), and signal-to-interference plus noise ratio. Moreover, concerning the amount of information sent as a transmission power signal, there are cases with 2 pieces of information on whether to increase/decrease the transmission power, 3 pieces of information on whether to increase/maintain/decrease the transmission power or 4 or more pieces of information with more detailed setting of the amount of control than the above cases.

First, the case where the control information consists of 2 pieces of information is explained. If the received signal strength is based, the power of reception RF is measured. If the measured power is greater than a threshold, a control signal is generated so that the transmission power from the base station is reduced and if the measured power is smaller than the threshold, the control signal is created so that the transmission power from the base station is increased. Such a method based on the received signal strength has the simplest circuit configuration. Furthermore, this method can be used in an environment where there is no interference signal.

If the desired signal reception power is based, the reception signal is measured by multiplying the reception signal by a known signal. If an interference signal exists, using the received signal strength alone would not mean that the reception power of the desired signal and that of the interference signal have been reported. Therefore, it is necessary to measure and report the reception power of the desired signal required by the communication terminal apparatus. Thus, it is desirable to use SINR as the reception quality, which is the most reliable information as an index to determine error rate characteristics.

Figure 18:
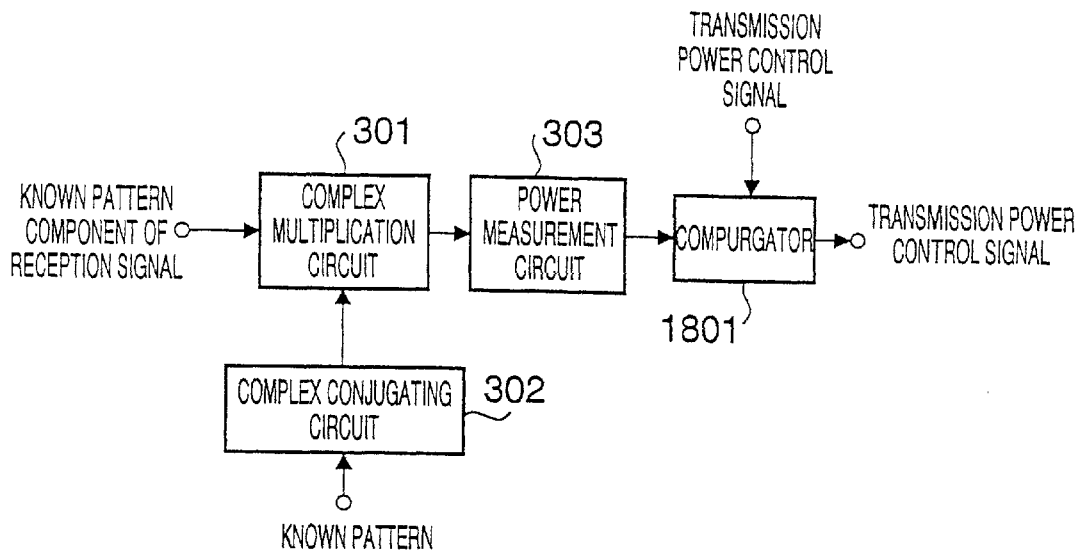
FIG. 18 is a block diagram to explain a method of measuring desired signal reception power in the communication terminal apparatus above.

The desired signal reception power measurement circuit is shown in FIG. 18. This circuit extracts the known pattern component of the reception signal; complex conjugate circuit 302 carries out a complex conjugate operation on the known pattern held by the base station; complex multiplication circuit 301 carries out a complex multiplication and calculates the position of the desired reception signal on the complex plane (position of the black circle in FIG. 5); and power measurement circuit 303 measures the power based on this calculation result. If the power measured by comparison circuit 1801 is greater than threshold 3, a control signal is generated so that the transmission power from the base station is reduced and if the measured power is smaller than threshold 3, the control signal is generated so that the transmission power from the base station is increased.

Figure 19:
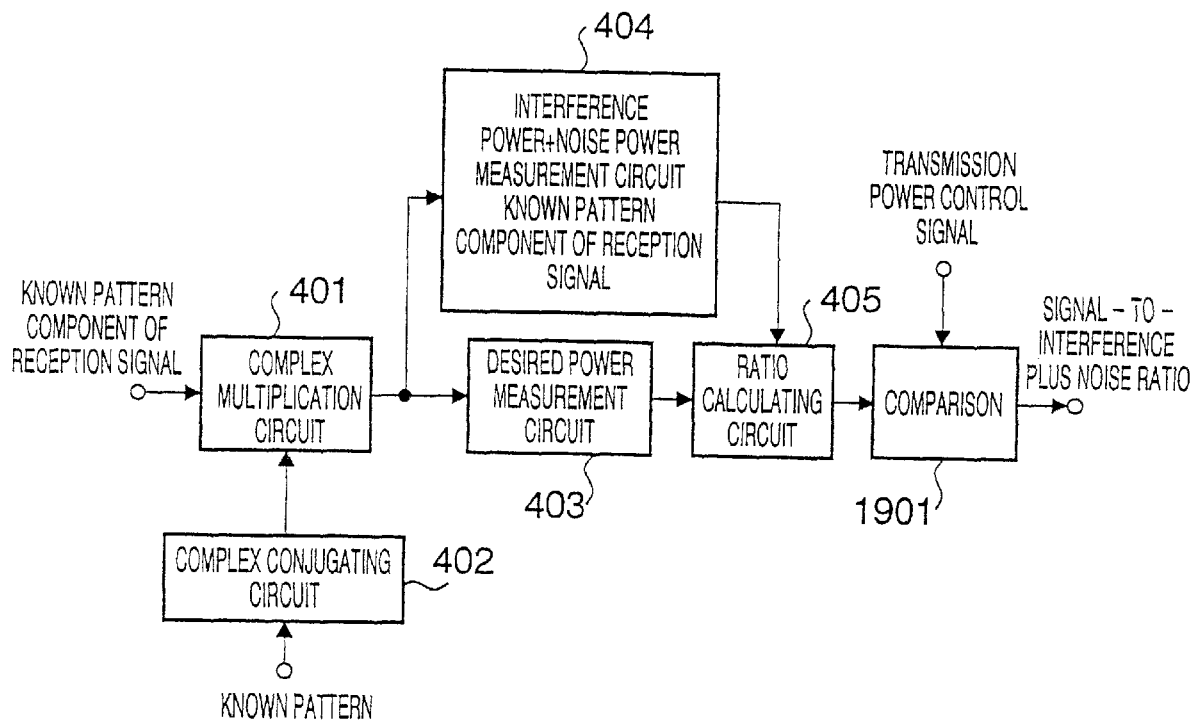
FIG. 19 is a block diagram to explain a method of measuring signal-to-interference plus noise ratio in the communication terminal apparatus above.

On the other hand, an SINR measurement circuit is shown in FIG. 19. This circuit extracts the known pattern component of the reception signal; complex conjugate circuit 402 carries out a complex conjugate operation on the known pattern held by the base station; complex multiplication circuit 401 carries out a complex multiplication and calculates the position of the desired reception signal on the complex plane (position of the black circle in FIG. 5); and the power is measured based on this calculation result. Furthermore, interference signal+noise power measurement circuit 404 measures interference signal power+noise power from a mean value of vector sum of squares between the position of each reception signal (position of the white circle in FIG. 5) and position of the desired reception signal (position of the black circle in FIG. 5). Furthermore, desired power measurement circuit 403 measures desired power. Then, ratio calculation circuit 405 calculates the ratio between the output of interference signal power+noise power measurement circuit 404 and the output of desired power measurement circuit 403. If the power ratio measured by comparison circuit 1901 is greater than threshold 3, a control signal is generated so that the transmission power from the base station is reduced and if the measured power ratio is smaller than threshold 3, a control signal is generated so that the transmission power from the base station is increased.

Then, the case where the control information has 3 pieces of information is explained. In the case of 3 pieces of information, threshold 3 and threshold 4 which is greater than threshold 3, are used as thresholds. If the power ratio measured is smaller than threshold 3, a control signal is generated so that the transmission power from the base station is increased. If the measured power ratio is greater than threshold 3 and smaller than threshold 4, a control signal is generated so that the transmission power from the base station is retained. If the measured power ratio is greater than threshold 4, a control signal is generated so that the transmission power from the base station is reduced.

Moreover, if the control information has 4 or more pieces of information, the number of thresholds is set to (number of control information pieces−1) to determine control information divided into smaller pieces through threshold judgment based on comparison among a plurality of thresholds.

The transmission power control information calculated in this way is sent to multiplexing circuit 206. Multiplexing circuit 206 assigns the transmission data and transmission power control information to a transmission slot. Modulation circuit 207 modulates such transmission data and transmission RF circuit 208 converts the frequency and amplifies the transmission data. This transmission signal is sent from antenna 201 via duplexer 202.

Thus, the transmission power control signal based on the reception quality of the downlink signal transmitted from the base station apparatus shown in FIG. 16 is generated by the communication terminal apparatus shown in FIG. 17 and reported to the base station apparatus on the uplink. The base station apparatus switches the transmission rate based on the transmission power control signal measured by the communication terminal apparatus received on the uplink.

Figure 20:
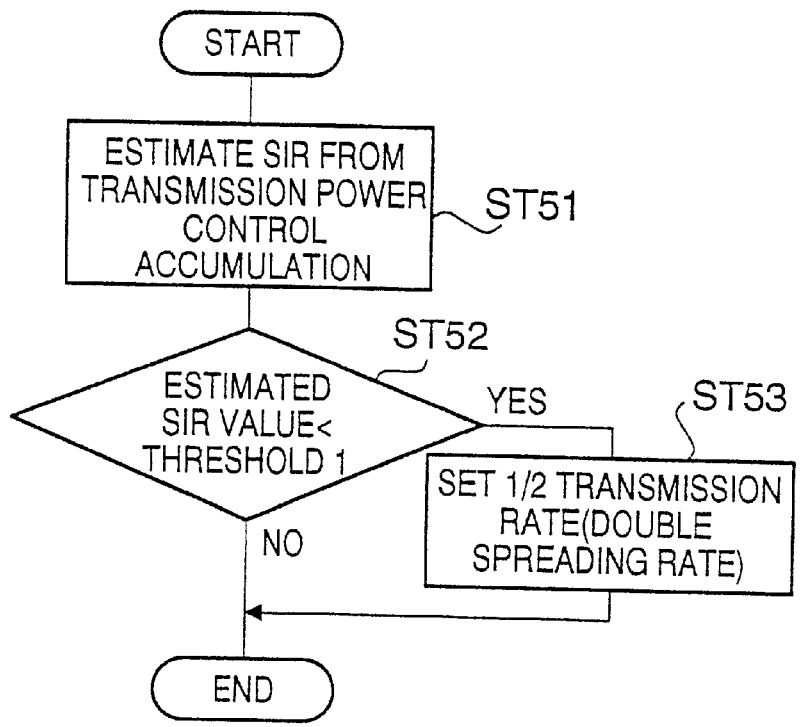
FIG. 20 is a flow chart to explain a method of switching the transmission rate in the base station apparatus according to the embodiment above.

Here, the operation of the transmission rate switching control circuit is explained in detail. FIG. 20 is a flow chart showing transmission rate switching control. The base station apparatus estimates the reception quality by accumulating the transmission power control information reported from the communication terminal apparatus (ST51) and compares it with threshold 1 (ST52). This threshold 1 is set according to the transmission rate but in the CDMA communication system, it is set according to the spreading factor or the number of multiplexing codes.

If reception quality estimated value (SIR estimated value) is greater than threshold 1, the channel condition is determined to be good and the same transmission rate is used. If the SIR estimated value is smaller than threshold 1, the channel condition is determined to be bad and the transmission rate is switched to a ½ transmission rate (×2 spreading factor)(ST53).

Thus, the transmission rate is switched based on the channel estimation result, making it possible to reduce interference with others. Furthermore, the use of the transmission power control bit for channel estimation can reduce the amount of information to be sent from the other end of communication without the need for special control information about transmission rate control.

Figure 21:
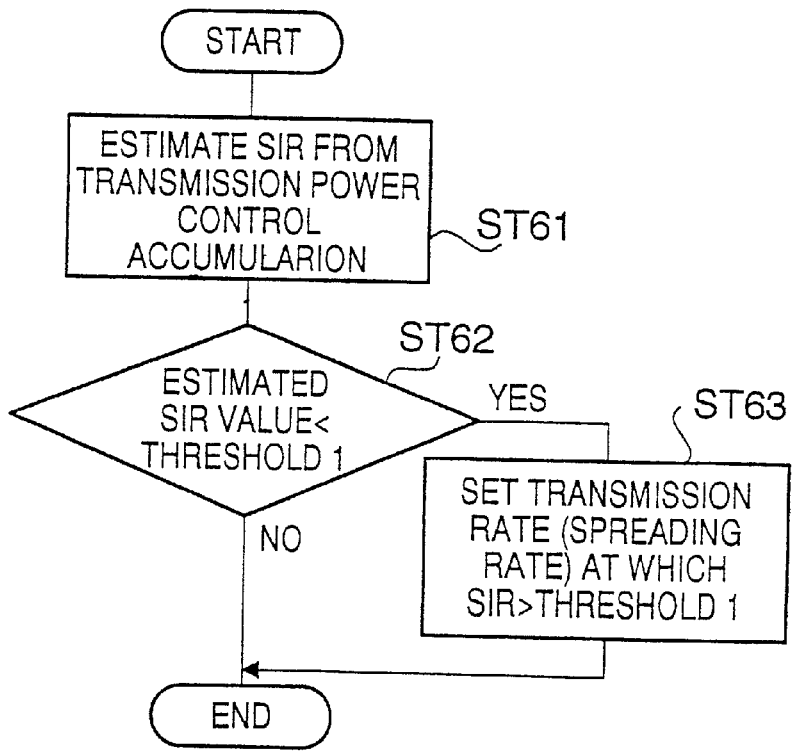
FIG. 21 is another flow chart to explain a method of switching the transmission rate in the base station apparatus according to the embodiment above.

Furthermore, as shown in FIG. 21, the base station apparatus estimates the reception quality by accumulating the transmission power control information reported from the communication terminal apparatus (ST61) and compares it with threshold 1 (ST62). If the SIR estimated value is greater than threshold 1, the channel condition is determined to be good and the same transmission rate is used. If the SIR estimated value is smaller than threshold 1, the channel condition is determined to be bad and SIR may be changed to such a transmission rate that SIR is greater than threshold 1 (ST63). This allows more accurate control over varying reception quality. That is, it is possible not only to improve the reception quality of the other end of communication even if the channel condition with the other end of communication deteriorates drastically but also to reduce the transmission power because the target reception quality reduces, also reducing interference with others. Therefore, it is possible to enhance the effect of transmission rate switching.

Figure 22:
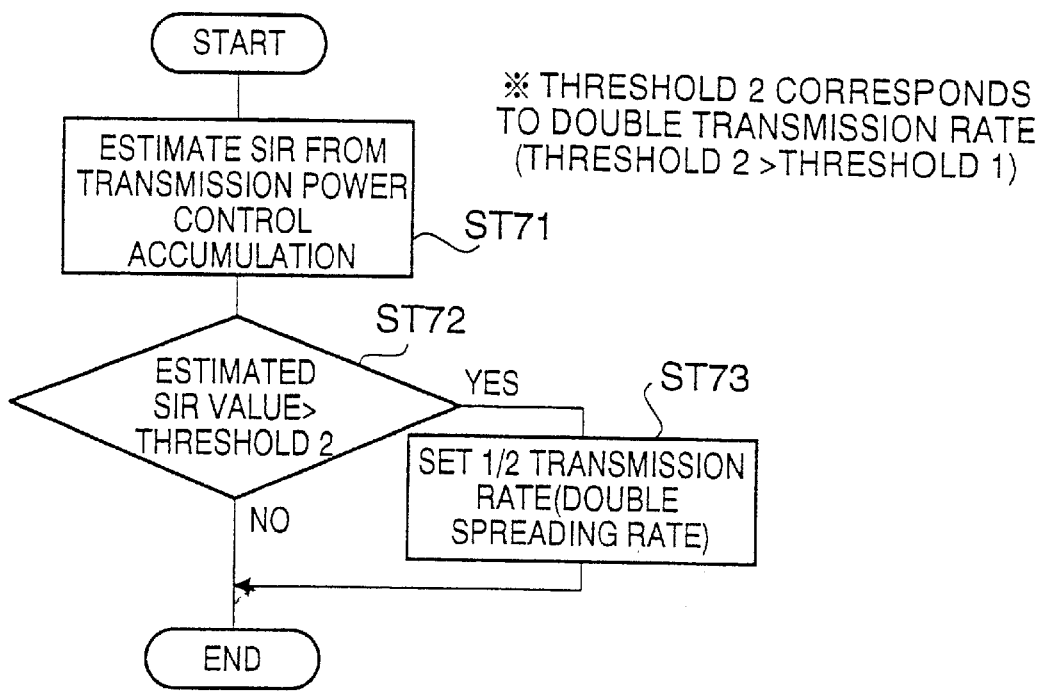
FIG. 22 is another flow chart to explain a method of switching the transmission rate in the base station apparatus according to the embodiment above.

As shown in FIG. 22, the base station apparatus estimates the reception quality by accumulating the transmission power control information reported from the communication terminal apparatus (ST71) and compares it with threshold 2 (ST72). If the SIR estimated value is smaller than threshold 2, the channel condition is determined to be bad and the same transmission rate is used. If the SIR estimated value is greater than threshold 2, the channel condition is determined to be good and the transmission rate may be switched to a double transmission rate (½ spreading factor) (ST73). Threshold 2 corresponds to a double transmission rate and is greater than threshold 1.

In this way, while the channel condition is good, the transmission rate is increased to transmit as much data as possible. That is, if the channel condition with the other end of communication is good, faster transmission is possible while maintaining the reception quality of the other end of communication. By the way, since transmission power is not increased, interference with others does not increase.

Figure 23:
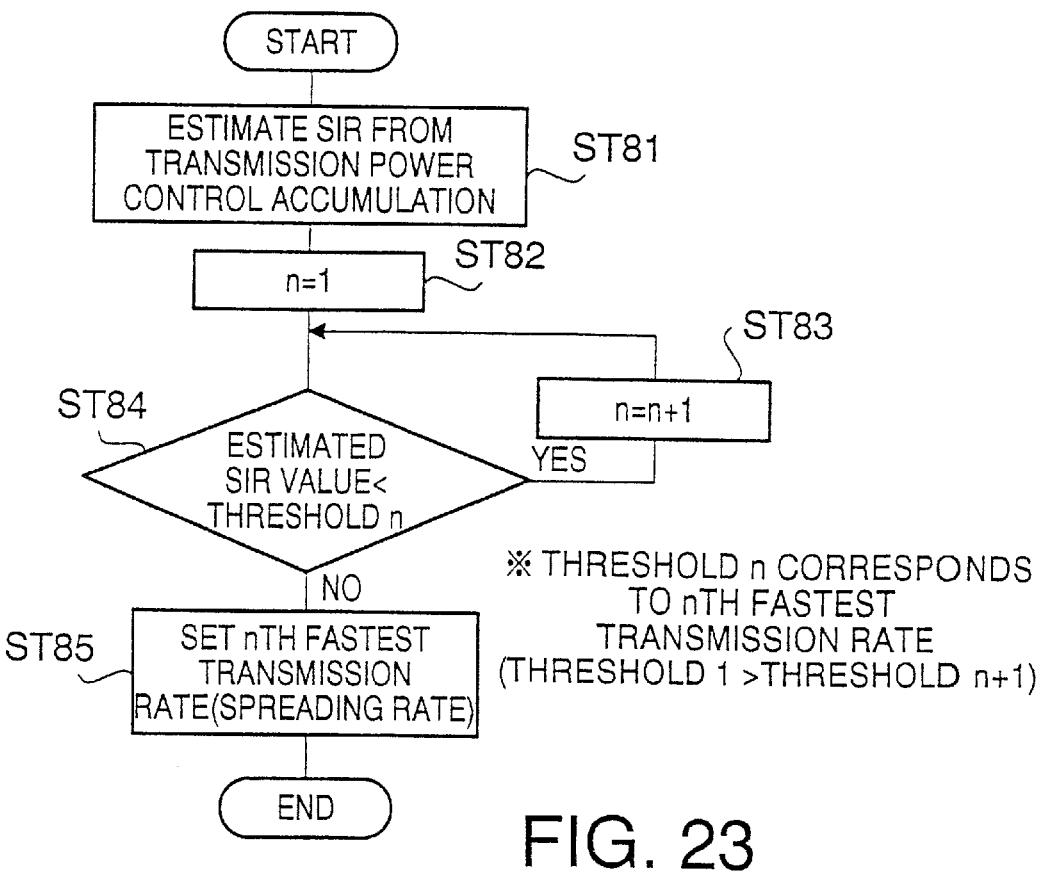
FIG. 23 is another flow chart to explain a method of switching the transmission rate in the base station apparatus according to the embodiment above.

As shown in FIG. 23, the base station apparatus estimates (ST82) the reception quality by accumulating the transmission power control information reported from the communication terminal apparatus by setting threshold n (ST81) and compares it with threshold n (ST84). If the SIR estimated value is smaller than threshold n, threshold n is changed to threshold n+1, which corresponds to the next fastest transmission rate (ST83). If the SIR estimated value is greater than threshold n, the nth fastest transmission rate (spreading factor) is set (ST85). That is, a transmission rate is selected so that the SIR estimated value is between threshold n and threshold n+1 corresponding to two transmission rates. Threshold n corresponds to the nth fastest transmission rate and is greater than threshold n+1. In this case, the fastest transmission is possible on condition that the reception quality be satisfied. This allows more accurate control of transmission rate according to the channel condition.

Figure 24:
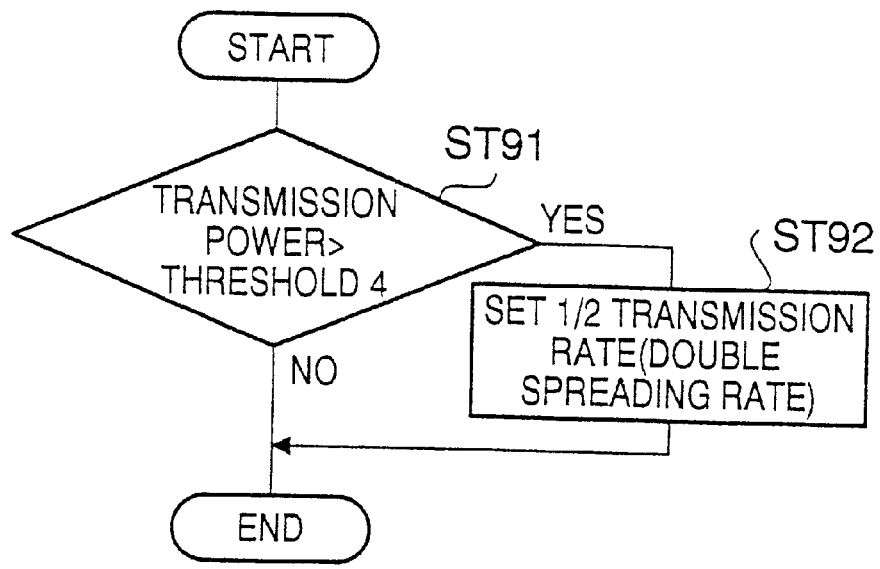
FIG. 24 is another flow chart to explain a method of switching the transmission rate in the base station apparatus according to the embodiment above.

Furthermore, the operation of another transmission rate switching control circuit is explained. As shown in FIG. 24, for example, the base station apparatus determines the required transmission power based on the transmission power control information reported from the communication terminal apparatus. This transmission power is compared with threshold 4 (ST91).

This threshold 4 is determined according to the amount of interference with others generated by increasing the limit value or transmission power of the transmitter. Threshold 4 is also set according to the transmission rate, but in the CDMA communication system it is set according to the spreading factor or the number of multiplexing codes. That is, if transmission is performed with ×16 spreading or ×256 spreading, there is a ×16 difference in terms of spreading factor and so the threshold of transmission power at ×16 spreading is 16 times the threshold of transmission power at ×256 spreading. The same applies to the number of multiplexing codes.

If the transmission power is smaller than threshold 4, the same transmission rate is used. If the transmission power is greater than threshold 4, interference with others is determined to be great and the transmission rate is switched to a ½ transmission rate (×2 spreading factor) (ST92). This allows the optimal or fastest transmission on condition that interference with others be within the allowable range.

Figure 25:
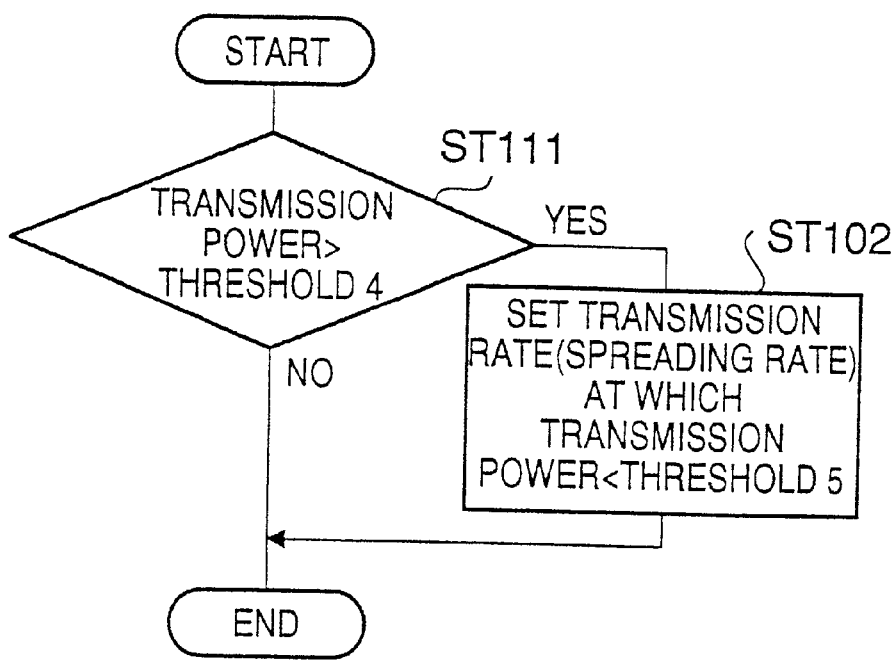
FIG. 25 is another flow chart to explain a method of switching the transmission rate in the base station apparatus according to the embodiment above.

Furthermore, as shown in FIG. 25, the base station apparatus determines the required transmission power based on the transmission power control information reported from the communication terminal apparatus. This transmission power is compared with threshold 4 (ST101) and if the transmission power is smaller than threshold 4, the same transmission rate is used and if the transmission power is greater than threshold 4, interference with others is determined to be great and a transmission rate (spreading factor) is selected so that the transmission power is smaller than threshold 4 (ST102). This can prevent an excessive amount of interference from generating.

Figure 26:
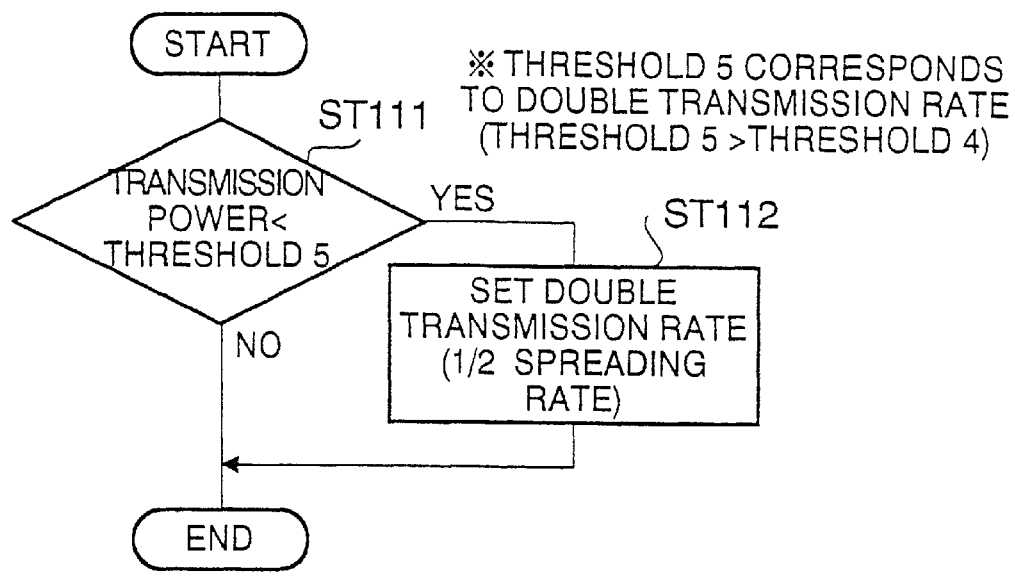
FIG. 26 is another flow chart to explain a method of switching the transmission rate in the base station apparatus according to the embodiment above.

Furthermore, as shown in FIG. 26, the base station apparatus determines the required transmission power based on the transmission power control information reported from the communication terminal apparatus. This transmission power is compared with threshold 5 (ST111) and if the transmission power is greater than threshold 5, the same transmission rate is used and if the transmission power is smaller than threshold 5, interference with others is determined to be small and the transmission rate may be switched to a double transmission rate(½ spreading factor)(ST112). Here, threshold 5 corresponds to a double transmission rate and is smaller than threshold 4.

Figure 27:
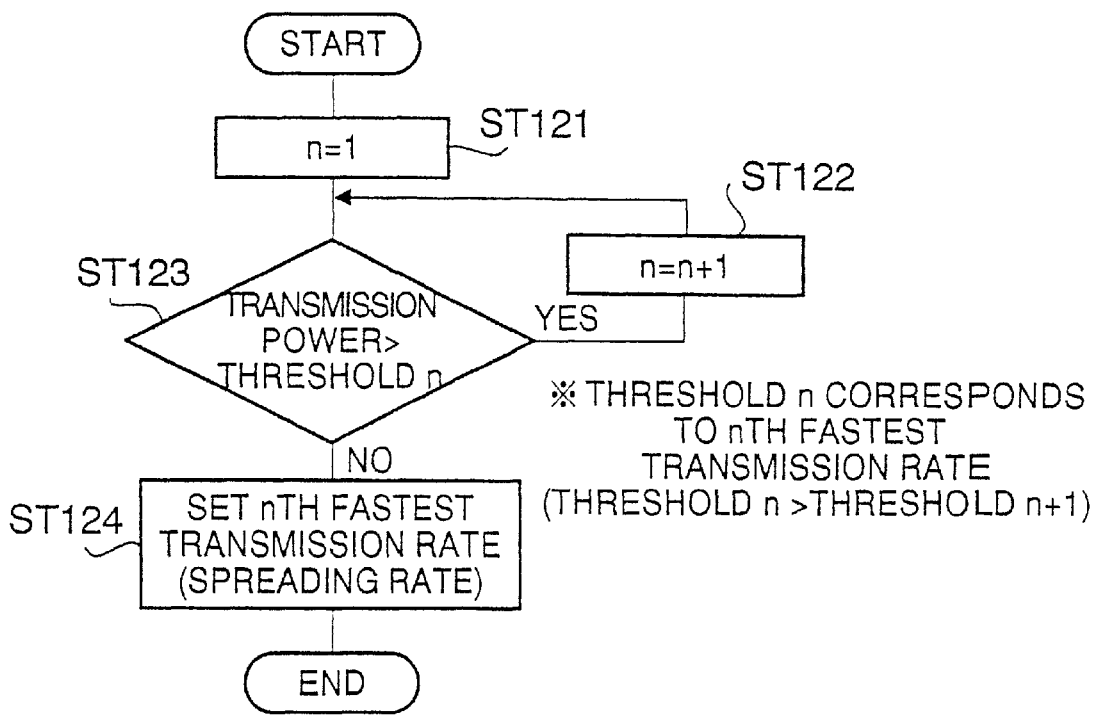
FIG. 27 is another flow chart to explain a method of switching the transmission rate in the base station apparatus according to the embodiment above.

Furthermore, as shown in FIG. 27, threshold n is set (ST121) and the base station apparatus compares the transmission power based on the transmission power control information reported from the communication terminal apparatus with threshold n (ST123). If the transmission power is greater than threshold n, threshold n is changed to threshold n+1, which corresponds to the next fastest transmission rate (ST122). If the transmission power is smaller than threshold n, the nth fastest transmission rate (spreading factor) is set (ST124). That is, a transmission rate is selected so that the transmission power is a value between threshold n and threshold n+1 corresponding to two transmission rates. Threshold n corresponds to the nth fastest transmission rate and is smaller than threshold n+1. In this case, the fastest transmission is possible on condition that the amount of interference with others be controlled within a certain range.

Furthermore, the base station sets transmission power in various ways; transmitting with the transmission power prior to switching every time the transmission rate is switched, transmitting with the transmission power prior to switching reduced by a certain value and transmitting with the transmission power prior to switching increased by a certain value.

The first method is valid to reliably improve the communication quality for the terminal. In the configuration of the present embodiment, a transmission power control signal input to transmission rate switching control circuit 106 can be sent to transmission RF circuit 109. Transmission RF circuit 109 controls increase/decrease of the transmission power based on the transmission power control signal.

The second method is a method of setting transmission power by subtracting a certain value from the transmission power when switching the transmission rate. This is because the transmission power possibly reaches a great value when the channel is improved for the terminal, generating great interference with other terminals. In this configuration of the embodiment, the transmission power control signal input to transmission rate switching control circuit 106 can be changed to such a control signal that the transmission power is reduced by a certain value when switching the transmission rate. Transmission RF circuit 109 controls increase/decrease of the transmission power based on the transmission power control signal. In this case, the transmission power control accumulated value also needs to be reduced by a certain value.

The third method is a method of increasing the transmission power within the allowable range of interference with others and is valid to improve the communication quality. In the configuration of this embodiment, the transmission power control signal input to transmission rate switching control circuit 106 can be changed to such a control signal that the transmission power is increased by a certain value when the transmission rate is switched. In this case, the transmission power control accumulated value also needs to be increased by a certain value.

For a certain value to decrease, in the CDMA system for example, transmission with power reduced by 3 dB allows one additional communication terminal apparatus communicating with a similar spreading factor.

Furthermore, together with the transmission power control information, the reception quality information can also be reported from the communication terminal apparatus using the method explained in Embodiment 1. The method of reporting from the communication terminal apparatus to the base station apparatus and its timing are the same as those in Embodiment 1.

Transmission rate switching control is normally performed based on the accumulated value of transmission power control information and if the reception quality on the communication terminal apparatus side deteriorates drastically, the reception quality information is reported from the communication terminal apparatus to the base station apparatus and the base station apparatus performs transmission rate switching control.

Furthermore, the base station apparatus sends a request for measurement of the reception quality to the communication terminal apparatus at the timing at which the communication terminal apparatus generates a request for resend of ARQ control information, etc., and the communication terminal apparatus measures the reception quality and reports it to the base station apparatus. The base station apparatus performs transmission rate switching based on the reception quality reported.

Figure 28:
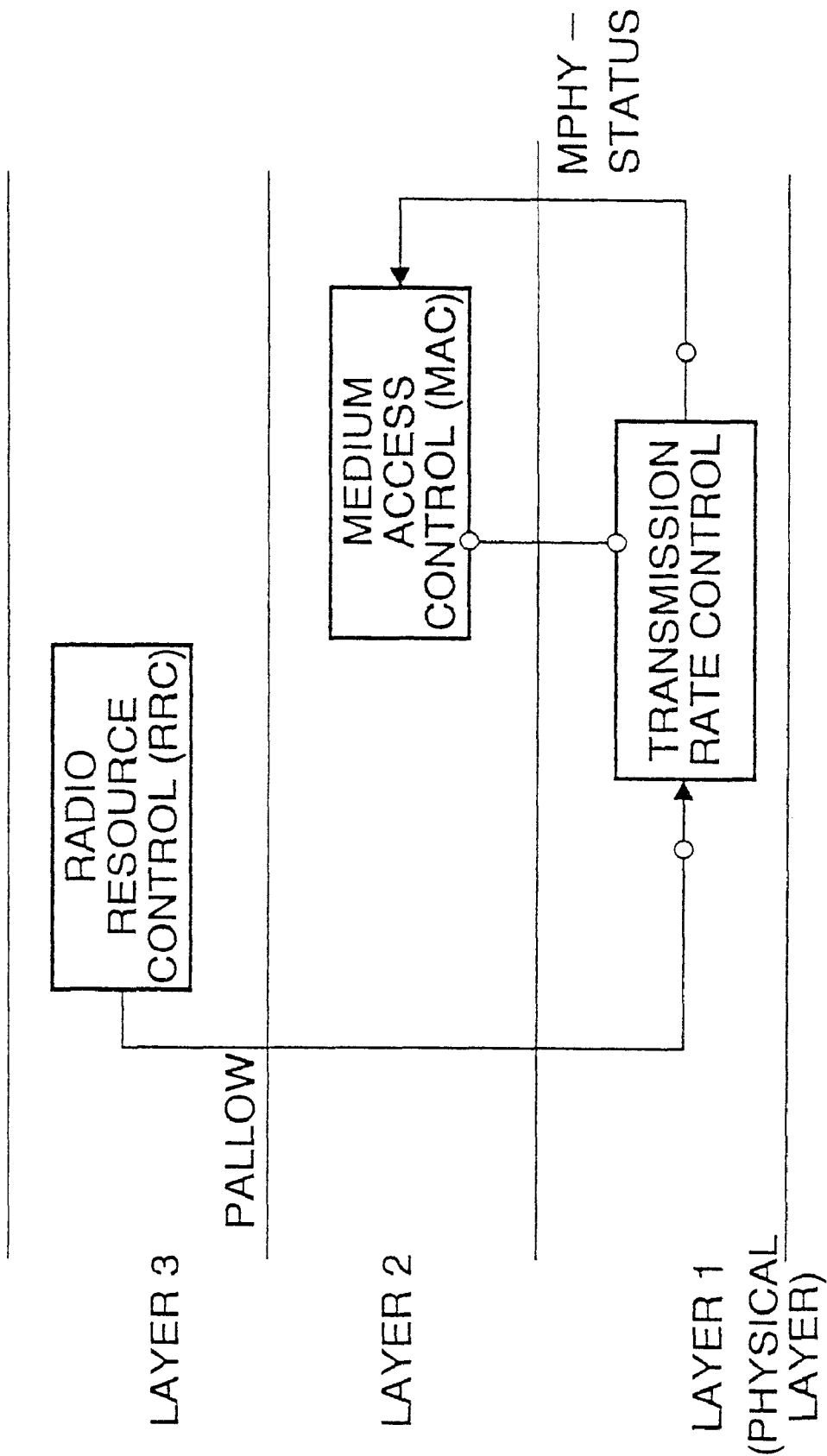
FIG. 28 is a diagram to explain transmission rate control between layers in the base station apparatus of the present invention.

Then, the control between layers in the transmission rate control method described in Embodiments 1 and 2 above is explained. FIG. 28 is a diagram to explain how the transmission rate is controlled between layers.

In this control, as shown in FIG. 28, allowable transmission power (Pallow) set in a radio resource control (RRC) layer of layer 3 is sent to layer 1 (physical layer). In layer 1, average transmission power is compared with allowable transmission power (Pallow). Then, a message (MPHY-STATUS) such as "Allowable transmission power has been reached" or "Allowable transmission power has been exceeded" or "Average transmission power is X dB below allowable transmission power" is indicated from layer 1 to the medium access control (MAC) layer of layer 2. The allowable transmission power is appropriately set by the radio resource control layer (layer 3) according to the system load such as the traffic condition.

Here, the message "Allowable transmission power has been reached" or "Allowable transmission power has been exceeded" indicates that the channel condition is determined to be bad and it is necessary to lower the transmission rate. On the other hand, the message "Average transmission power is X dB below allowable transmission power" indicates that the channel condition is recovered and the transmission rate can be increased.

Figure 29:
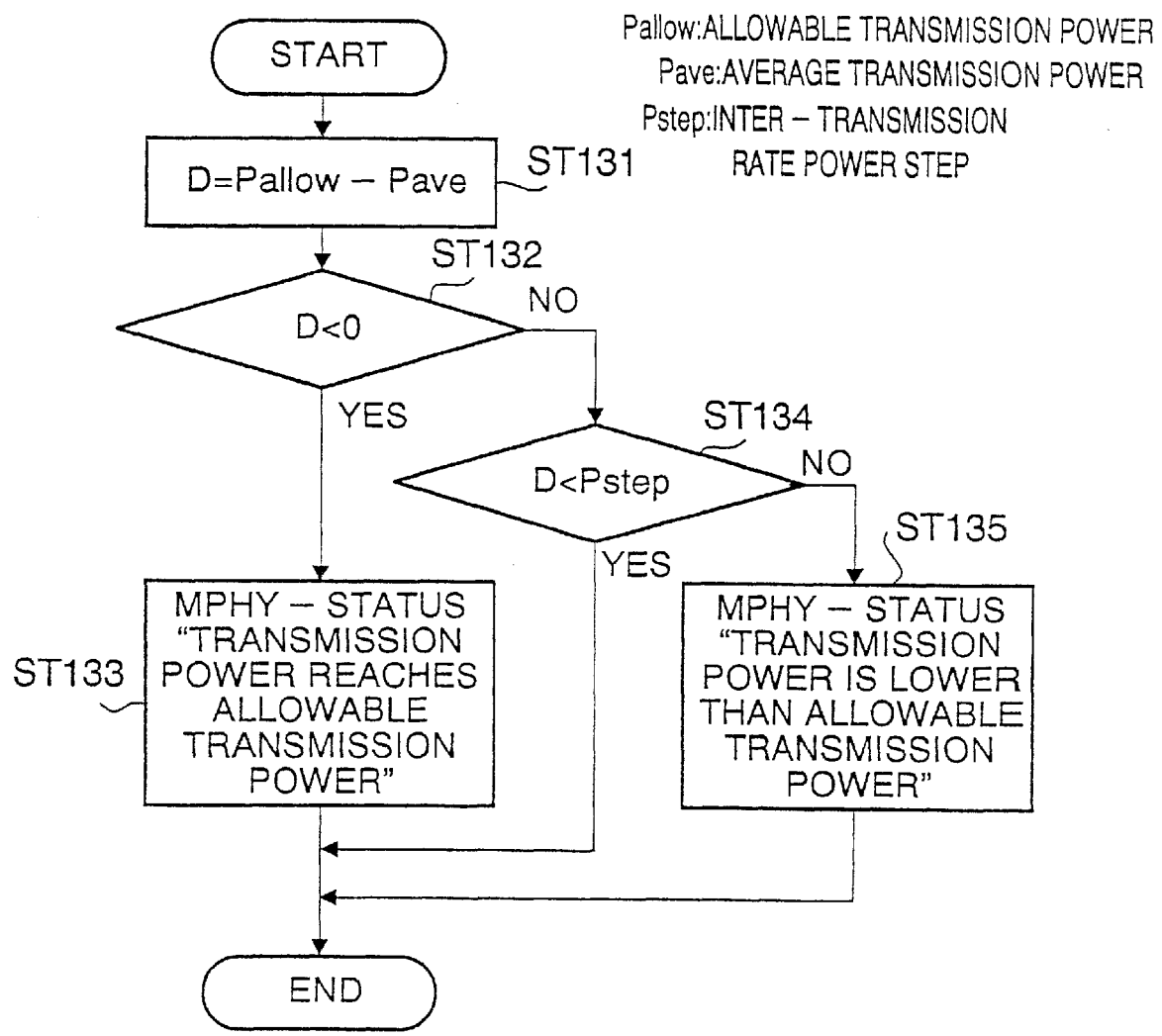
FIG. 29 is a flow chart to explain transmission rate control between layers in the base station apparatus of the present invention.

Details of control are explained using FIG. 29. Here, a case with the downlink is explained. First, the radio resource control layer monitors the downlink traffic condition and determines the initial transmission rate on the downlink through negotiation between the radio resource control layer (layer 3) and medium access control layer (layer 2). Then, a communication is started.

During a communication, in ST131, at least one frame of average transmission power (Pave) is monitored in layer 1. The transmission rate is controlled according to this channel condition.

First, this average transmission power (Pave) is compared with allowable transmission power (Pallow) and the difference between these two (D=Pallow−Pave) is obtained. Then, in ST132, it is determined whether average transmission power (Pave) exceeds allowable transmission power (Pallow) or not. If average transmission power (Pave) exceeds allowable transmission power (Pallow), a message "Allowable transmission power has been reached" or "Allowable transmission power has been exceeded" is indicated in ST133.

According to this message, the transmission rate is lowered in medium access control layer (layer 2) and total (average) transmission power is reduced in layer 1. This reduces interference with other communication terminals.

If average transmission power (Pave) does not exceed allowable transmission power (Pallow), it is determined whether the difference is at least a predetermined value (Pstep) in ST134. This Pstep is a power step corresponding to the difference between the changed transmission rate and original transmission rate when the transmission rate is lowered.

If difference (D) between average transmission power (Pave) and allowable transmission power (Pallow) is smaller than predetermined value (Pstep), the same transmission rate is used. If difference (D) between average transmission power (Pave) and allowable transmission power (Pallow) is greater than predetermined value (Pstep), layer 1 indicates a message "Average transmission power is X dB below allowable transmission power" in ST135. Then, according to this message, medium access control layer (layer 2) increases the transmission rate and layer 1 increases the total transmission power within the range of XdB. This makes it possible to immediately send the transmission signal that has been buffered due to the lowered transmission rate.

In FIG. 29, it is only determined whether the transmission rate is "increased" or "maintained" or "lowered," but judgment is not limited to this; it is also possible to freely set a command to make the transmission rate variable beyond this limitation.

Then, a case where the aforementioned transmission rate control is actually performed is explained. According to the existing method of changing the transmission rate, the downlink is designated for burst transmission and the uplink is designated for continuous transmission. Therefore, the transmission rate is changed according to this. That is, transmission power itself is not changed on the downlink, and, for example, transmission is performed only in the first half of a frame, and on the uplink, transmission power is lowered and transmission is performed through rate matching without perforating the frame. The medium access control layer (layer 2) selects the transmission rate among a rate set specified by the radio resource control layer (layer 3). At this time, the physical layer (layer 1) creates and adds a word indicating the current transmission rate as instructed by the medium access control layer (layer 2).

Furthermore, when each base station performs the transmission rate control above separately, negotiation is required when diversity handover takes place. For example, a method by which all base stations select a specific transmission rate through negotiation in the upper layer and another method by which no transmission rate control is performed during diversity handover are possible examples of this.

The explanation above describes the case where the parameter monitored in layer 1 is transmission power, but FER, SIR or interference power can also be used as the parameter monitored in layer 1.

The explanation above describes the case where the transmission rate control shown in FIG. 29 is performed on the downlink, but the transmission rate control shown in FIG. 29 can also be applied to the uplink.

Transmission rate control on the downlink is used to reduce interference with others but transmission rate control on the uplink is not only used to reduce interference with others but also used to achieve power saving or when there are hardware restrictions.

Embodiments 1 and 2 above describe the apparatus shown in FIG. 1 and FIG. 16 as the base station apparatus and the apparatus shown in FIG. 2 and FIG. 17 as the communication terminal apparatus, but the present invention is also applicable to the case where the apparatus shown in FIG. 1 and FIG. 16 is the communication terminal apparatus and the apparatus shown in FIG. 2 and FIG. 17 is the base station apparatus.

Furthermore, Embodiments 1 and 2 describe the case with a transmission rate set to ×2 or ½, but in the present invention, the transmission rate can also be set to other magnifications according to various conditions.

As explained above, in the radio communication apparatus and transmission rate control method of the present invention, the base station can switch the transmission rate of the base station based on a transmission power control signal of the base station that the terminal has determined by measuring the reception quality. This allows appropriate control by the base station over transmission power to the mobile station without being affected by the environment of the mobile station or transmission speed.

This application is based on the Japanese Patent Application No.HEI 10-107300, entire content of which is expressly incorporated by reference herein.

INDUSTRIAL APPLICABILITY

The present invention is applicable to a base station apparatus and communication terminal apparatus in a digital radio communication system.

What is claimed is:

1. A transmission rate control apparatus comprising:
   receiving means for receiving a received quality measured at a communication terminal; and
   rate changing means for changing a transmission rate to said communication terminal based on the received quality,
   wherein said rate changing means decreases the transmission rate when the received quality at a side of said communication terminal deteriorates rapidly.

2. The transmission rate control apparatus according to claim 1, wherein, after said rate changing means decreases the transmission rate when the received quality at a side of said communication terminal deteriorates rapidly, said rate changing means changes the transmission rate to an original value when the received quality at the side of said communication terminal subsequently improves.

3. A base station apparatus provided with a transmission rate control apparatus, said transmission rate control apparatus comprising:
   receiving means for receiving a received quality measured at a communication terminal; and
   rate changing means for changing a transmission rate to said communication terminal based on the received quality,
   wherein said rate changing means decreases the transmission rate when the received quality at a side of said communication terminal deteriorates rapidly.

4. The base station apparatus according to claim 3, wherein, after said rate changing means decreases the transmission rate when the received quality at a side of said communication terminal deteriorates rapidly, said rate changing means changes the transmission rate to an original value when the received quality at the side of said communication terminal subsequently improves.

5. A communication terminal apparatus comprising:
   monitoring means for means monitoring a received quality;
   judging means for judging whether the received quality deteriorates; and
   transmitting means for transmitting the received quality at a timing at which said judging means judges that the received quality deteriorates.

6. A transmission rate control method comprising:
   a receiving step of receiving a received quality measured at a communication terminal; and
   a rate changing step of changing a transmission rate to said communication terminal based on the received quality,
   wherein the transmission rate is decreased when the received quality at a side of said communication terminal deteriorates rapidly.

7. The transmission rate control method according to claim 6, wherein in said rate changing step, after said transmission rate is decreased when the received quality at a side of said communication terminal deteriorates rapidly, said transmission rate is changed to an original value when the received quality at the side of said communication terminal subsequently improves.

* * * * *